United States Patent [19]

Kuwana et al.

[11] Patent Number: 5,051,907
[45] Date of Patent: Sep. 24, 1991

[54] ANTI-SKID CONTROL SYSTEM FOR AN AUTOMOTIVE VEHICLE

[75] Inventors: Kazutaka Kuwana, Toyota; Yasuo Noda; Daiju Nomura, both of Kariya; Tsuyoshi Yoshida, Oobu, all of Japan

[73] Assignee: Aisin Seiki K.K., Aichi, Japan

[21] Appl. No.: 454,586

[22] Filed: Dec. 21, 1989

[30] Foreign Application Priority Data

Dec. 24, 1988 [JP] Japan ............................ 63-327425

[51] Int. Cl.[5] .............................................. B60T 8/60
[52] U.S. Cl. .................................. 364/426.02; 303/95; 303/100
[58] Field of Search ................... 364/426.02; 180/197; 303/95, 102, 103

[56] References Cited

U.S. PATENT DOCUMENTS

| 4,450,037 | 8/1990 | Kopper et al. | 303/110 |
| 4,749,239 | 6/1988 | Onogi et al. | 303/95 |
| 4,805,104 | 2/1989 | Kishimoto et al. | 364/426.01 |
| 4,859,002 | 8/1989 | Yoshiro | 303/103 |
| 4,902,076 | 2/1990 | Ushijima et al. | 303/100 |

FOREIGN PATENT DOCUMENTS 62125942 6/1985 Japan .
62125944 6/1989 Japan .

Primary Examiner—Thomas G. Black
Attorney, Agent, or Firm—Sughrue, Mion, Zinn, Macpeak & Seas

[57] ABSTRACT

An anti-skid control system for an automotive vehicle is provided with an actuator which is disposed in a hydraulic circuit between a hydraulic pressure generator and a wheel brake cylinder. The actuator is operated by an electronic controller so as to control a hydraulic braking pressure supplied to the wheel brake cylinder in response to at least an output of a wheel speed sensor which detects a rotational speed of a road wheel. In the controller, a desired hydraulic pressure is set, and the actuator is operated to control the hydraulic braking pressure to the desired hydraulic pressure. Where the actuator comprises a proportional pressure control solenoid valve connected to the controller which is provided with a resistor for detecting a current fed to the solenoid valve, the desired hydraulic pressure is set in response to the current.

8 Claims, 10 Drawing Sheets

ANTI-SKID CONTROL SYSTEM FOR AN AUTOMOTIVE VEHICLE

BACKGROUND OF THE INVENTION

1. Field of the Invention

The present invention relates to an anti-skid control system for use in an automotive vehicle, and more particularly to an anti-skid control system for controlling a braking force applied to road wheels in braking operation to prevent the road wheels from being locked.

2. Description of the Prior Art

It is known that the vehicle stability or the controllability is influenced detrimentally depending upon the road surface condition, when road wheels are locked in abrupt braking operation. In order to prevent the road wheels from being locked, therefore, there has been employed an anti-skid control system which controls the braking force by decreasing, increasing, or holding a hydraulic braking pressure supplied to wheel brake cylinders, and which is also called as an anti-locking control system. The anti-skid control system includes the system for the rear road wheels and that for front and rear road wheels, i.e., four wheel control system. In the case where the road wheels are prevented from being locked according to the former system, the running stability may be ensured and the stopping distance may be minimized. In the case where the front road wheels are also prevented from being locked according to the latter system, the controllability may be maintained.

In view of the fact that, when a hydraulic braking pressure supplied to each wheel brake cylinder (hereinafter referred to as wheel cylinder pressure) is increased, the rotational speed of the road wheel is rapidly reduced immediately before the coefficient of friction relative to the road wheel reaches its maximum value, the anti-skid control system controls the wheel cylinder pressure according to the deceleration of the vehicle in order that a slip rate of the road wheel results in around 20%, that is, the maximum coefficient of friction is obtained.

The coefficient of friction varies depending upon the condition of the road surface. For example, the rotational speed of the road wheel in braking operation is rapidly reduced on the road surface which is low in coefficient of friction, e.g., the snow-covered road surface, whereas the recovery of the rotational speed of the road wheel is slow when the wheel cylinder pressure is decreased. In this case, it is necessary to ensure running stability with the wheel cylinder pressure decreased earlier so as to prevent the road wheel from being locked. On the contrary, it is preferable to shorten the stopping distance on the road surface which is high in coefficient of friction, through the fine control immediately before the occurrence of locking of the road wheel. Thus, the braking force is required to be controlled in accordance with the coefficient of friction of the road surface. In this braking force control, it is necessary to detect the coefficient of friction at first. Whereas, it is impossible to directly detect the coefficient of friction of the road surface in the running vehicle, so that the coefficient of friction is estimated on the basis of the reduction of the rotational speed of the road wheel, the pressure decreasing time or the like. Namely, the reduction of the rotational speed of the road wheel is made slowly and the pressure decreasing time is short on the road surface having a high coefficient of friction, whereas the reduction of the rotational speed of the road wheel is made fast and the pressure decreasing time is long on the road surface having a low coefficient of friction, so that the coefficient of friction is estimated on the basis of the reduction of the rotational speed of the road wheel, the pressure decreasing time, or the like.

However, even if the vehicle is running on the road surface having the low coefficient of friction, in the case where a depressing force applied on a brake pedal is small and the wheel cylinder pressure is low, a tendency of reduction of the rotational speed of the road wheel is similar to that in braking operation on the road surface having the high coefficient of friction. Thus, in transition to the anti-skid control, the road surface in the above case is determined to be the road surface having the high coefficient of friction, so that the wheel cylinder pressure is controlled as if the vehicle is running on the road surface having the high coefficient of friction, whereby the road wheels are immediately locked to cause so-called early locking of the road wheels. In order to prevent this early locking, it is proposed to directly detect the wheel cylinder pressure and measure the coefficient of friction of the road surface based upon the wheel cylinder pressure detected in braking operation. For detecting the wheel cylinder pressure, a pressure sensor may be employed. The anti-skid control system provided with the pressure sensor, therefore, has been proposed in Japanese Patent Laid-open Publication Nos. Sho 62-125942 and Sho 62-125944, for example.

However, when the pressure sensor is employed in the system as disclosed in the above publications, an increase in cost is indispensable. Not only the cost of the pressure sensor itself, but also the production cost of the whole system is increased, since the time for installing each pressure sensor on a vehicle and wiring of the pressure sensor to a controller is increased. Particularly, the aforementioned four wheel control system requires four pressure sensors, which necessitates a considerable increase in cost.

In the prior anti-skid control system as described above, since the pressure sensor functions to detect the hydraulic pressure supplied from a hydraulic pressure generator such as a master cylinder to the wheel brake cylinders through actuators disposed therebetween, it is difficult to control the wheel cylinder pressure to a desired hydraulic pressure of a certain value based on the output of the pressure sensor. Thus, the pressure sensor is provided not for the active utilization thereof, i.e., setting the desired hydraulic pressure, but only for the passive utilization thereof. In the anti-skid control system, wherein the wheel cylinder pressure in braking operation must be set in accordance with the coefficient of friction of the road surface and then quickly supplied to the wheel brake cylinders, it is necessary to reduce the delay of control of the wheel cylinder pressure as small as possible.

SUMMARY OF THE INVENTION

Accordingly, it is an object of the present invention to provide an anti-skid control system for an automotive vehicle which sets a desired hydraulic pressure for a hydraulic braking pressure supplied to a wheel brake cylinder, i.e., a wheel cylinder pressure in braking operation, and controls the wheel cylinder pressure to the desired hydraulic pressure.

It is another object of the present invention to provide an anti-skid control system which controls the wheel cylinder pressure to the desired hydraulic pressure set for the anti-skid control without a pressure sensor.

It is a further object of the present invention to provide an anti-skid control system which is easily and economically provided with means for setting the desired hydraulic pressure.

In accomplishing these and other objects, an anti-skid control system for an automotive vehicle according to the present invention is installed in a vehicle braking system which has a wheel brake cylinder for applying a braking force to a road wheel and pressure generating means for supplying a hydraulic braking pressure to the wheel brake cylinder. The anti-skid control system comprises actuating means disposed in a hydraulic circuit between the pressure generating means and the wheel brake cylinder for controlling the hydraulic braking pressure supplied to the wheel brake cylinder, wheel speed detecting means for detecting a rotational speed of the road wheel, and braking force control means for controlling the braking force applied to the road wheel in response to at least an output of the wheel speed detecting means. The braking force control means includes control means for operating the actuating means and desired hydraulic pressure setting means for setting a desired hydraulic pressure for the control means. The control means operates the actuating means to control the hydraulic braking pressure supplied to the wheel brake cylinder to the desired hydraulic pressure.

In the above-described anti-skid control system, the actuating means preferably comprises a proportional pressure control solenoid valve which controls the hydraulic braking pressure in substantially linear proportion to a current fed thereto, and the braking force control means preferably comprises current detecting means for detecting the current and providing an output thereof to the control means. The desired hydraulic pressure setting means sets the desired hydraulic pressure in response to the output of the current detecting means.

The desired hydraulic setting means may be arranged to set a first desired hydraulic pressure of a predetermined value during a predetermined period of time after start of braking operation.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
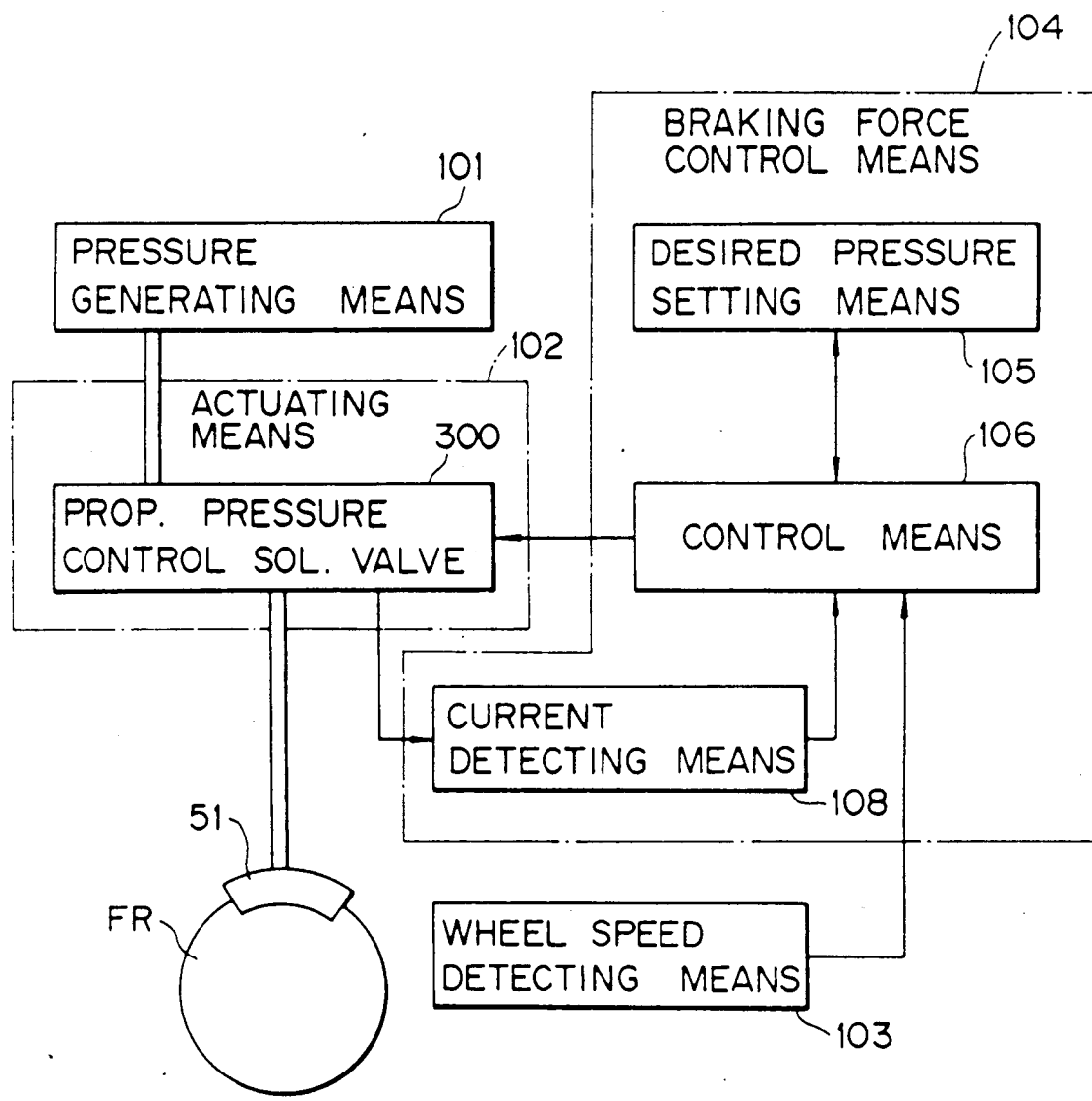
FIG. 1 is a general block diagram illustrating an anti-skid control system according to the present invention.

Referring to FIG. 1, there is illustrated an anti-skid control system according to the present invention. Representing one of four wheel brake cylinders mounted on road wheels of a vehicle, a wheel brake cylinder 51 which applies a braking force to a road wheel FR of the vehicle is shown in FIG. 1. Pressure generating means 101 supplies a hydraulic braking pressure to the wheel brake cylinder 51. Actuating means 102 is disposed in a hydraulic circuit for connecting the pressure generating means 101 to the wheel brake cylinder 51. Wheel speed detecting means 103 detects the rotational speed of the road wheel FR. Braking force control means 104 controls the braking force applied to the road wheel FR in response to at least an output signal of the wheel speed detecting means 103. Further, the braking force control means 104 includes control means 106 for operating the actuating means 102, and desired hydraulic pressure setting means 105 for setting a desired hydraulic pressure for the control means 106. The control means 106 operates the actuating means to control the hydraulic braking pressure supplied to the wheel brake cylinder 51 to the desired hydraulic pressure. For each of two road wheels or four road wheels, there is provided the respective means described above except the pressure generating means 101.

The actuating means 102 comprises a proportional pressure control solenoid valve 300 which controls the hydraulic braking pressure in substantially linear proportion to a current fed to the solenoid valve 300, and the braking force control means 104 comprises current detecting means 108 for detecting the current fed to the solenoid valve 300 to provide an output thereof to the control means 106. The desired pressure setting means 105 sets the desired hydraulic pressure in response to the output of the current detecting means 108. Specifically, the desired hydraulic pressure setting means 105 sets a first desired hydraulic pressure of a predetermined value during a predetermined period of time after start of braking operation. Further, the desired hydraulic pressure setting means 105 sets a second desired hydraulic pressure of a value determined by an acceleration of the road wheel FR and a slip rate obtained from the output of the wheel speed detecting means 103 during a period of time following the predetermined period of time up to the time when the acceleration of the road wheel FR is maximum.

According to the above-described anti-skid control system, when the pressure generating means 101 is operated, the hydraulic braking pressure is supplied to the wheel brake cylinder 51 through the actuating means 102, so that the braking force is applied to the road wheel FR. Then, the rotational speed of the road wheel FR, i.e., the wheel speed is detected by the wheel speed detecting means 103. The operation of the actuating means 102 is controlled by the braking force control means 104. In the braking force control means 104, the desired hydraulic pressure is set by the desired hydraulic pressure setting means 105, as a value corresponding to the condition of the road surface on behalf of the control means 106. Then, the actuating means 102 is operated by the control means 106 so that the hydraulic braking pressure supplied to the wheel brake cylinder 51 is controlled to the above desired hydraulic pressure.

Thus, if the desired hydraulic pressure is set as a predetermined value at which the road wheel FR is prevented from being locked, for example, the hydraulic braking pressure of the wheel braking cylinder 51 on the road wheel FR, which is caused to develop a tendency to be locked with the braking force applied, is immediately lowered to the desired hydraulic pressure by the braking force control means 104, and then the normal anti-skid control by the braking force control means 104 on the basis of the output signal of the wheel speed detecting means 103 is executed. Namely, the actuating means 102 is operated in accordance with the slip rate of the road surface to decrease, increase or hold the hydraulic braking pressure of the wheel brake cylinder 51 so that the road wheel FR is prevented from being locked. As is well known, the slip rate S is calculated by the following equation:

$$S = (Vs - Vw)/Vs \times 100(\%)$$

where Vw corresponds to the rotational speed of the road wheel, i.e., the wheel speed, and Vs corresponds to the estimated vehicle speed obtained from the wheel speed Vw.

Figure 2A:
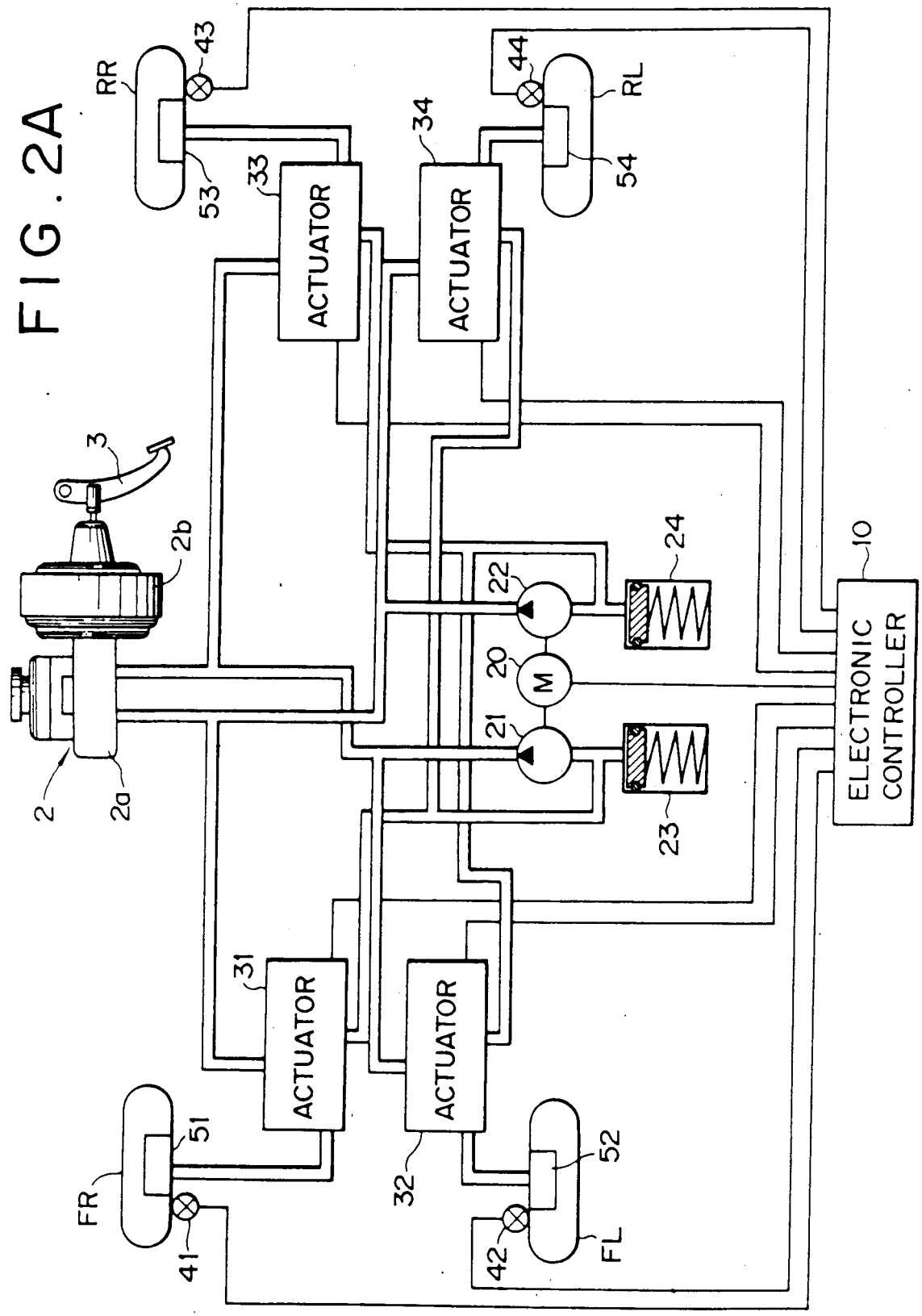
FIG. 2A is a schematic block diagram of an anti-skid control system of an embodiment of the present invention.

More specifically, there is illustrated in FIG. 2A an embodiment of the present invention, in which pumps 21, 22, reservoir 23, 24 and actuators 31 to 34 are disposed in hydraulic circuits for connecting a hydraulic pressure generator 2, which comprises a master cylinder 2a and a booster 2b operated in response to depression of a brake pedal 3, to wheel brake cylinders 51 to 54 of road wheels FR, FL, RR, and RL. The road wheel FR designates a road wheel at the fore right side as viewed from the position of a driver's seat, the road wheel FL designates a road wheel at the fore left side, the road wheel RR designates a road wheel at the rear right side, and the road wheel RL designates a road wheel at the rear left side, and a so-called diagonal circuit is employed as is apparent from FIG. 2A.

The actuators 31, 34 are disposed respectively in hydraulic circuits for connecting one output port of the master cylinder 2a to the wheel brake cylinders 51, 54, and the pump 22 is disposed between the actuators 31 and 34. Similarly, the actuators 32, 33 are disposed respectively in hydraulic circuits for connecting the other output port of the master cylinder 2a to the wheel brake cylinders 52, 53, and the pump 21 is disposed between the actuators 32 and 33. The pumps 21, 22 are driven by an electric motor 20, so that brake fluid raised to a predetermined pressure is supplied to these hydraulic circuits. Accordingly, these hydraulic circuits serve as the circuits through which the hydraulic braking pressure is supplied to the actuators 31 to 34, and the hydraulic pressure generator 2 and the pumps 21, 22 constitute the pressure generating means according to the present invention.

The hydraulic circuits at the drain side of the actuators 31, 34 are connected to the pump 21 through the reservoir 23, and the hydraulic circuits at the drain side of the actuators 32, 33 are connected to the pump 22 through the reservoir 24. Each of the reservoirs 23, 24 is provided with a piston and a spring, and functions so as to store the brake fluid returned from each of the actuators 31 to 34 through the hydraulic circuits at the drain side thereof, and to supply the brake fluid to each of the actuators 31 to 34 when the pumps 21, 22 operate.

Figure 2B:
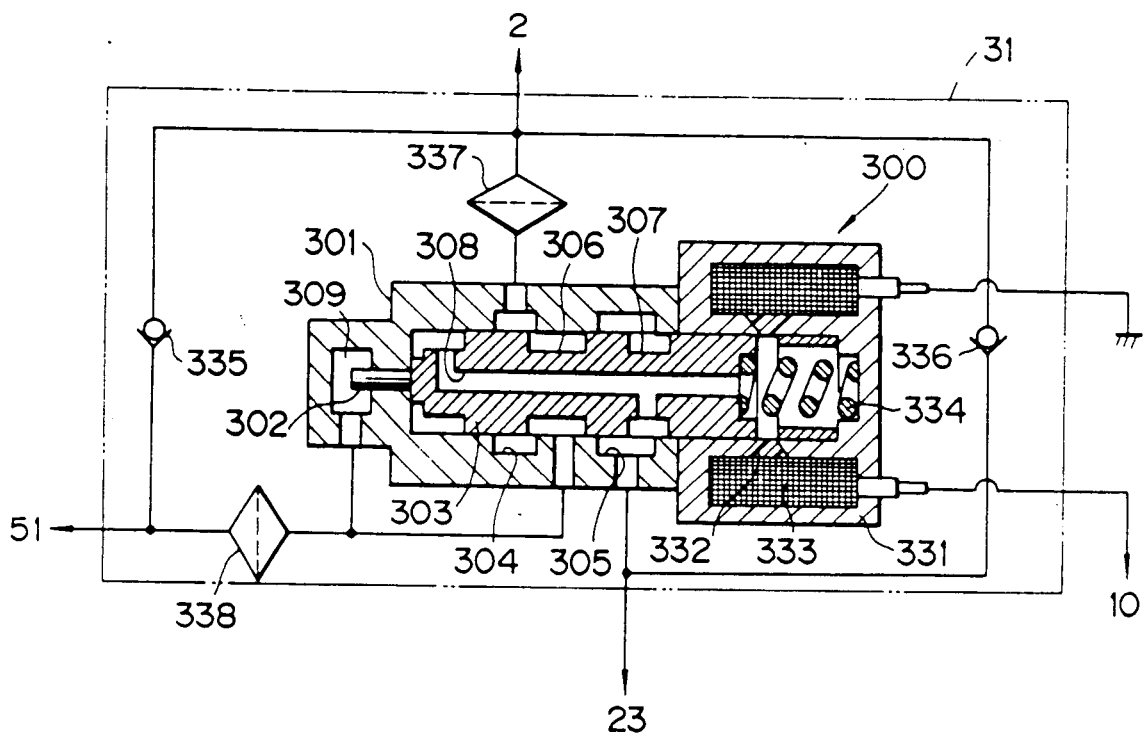
FIG. 2B is a sectional view of a proportional pressure control solenoid valve arranged in the actuator shown in FIG. 2A.

Each of the actuators 31 to 34 is provided with a proportional pressure control solenoid valve 300 (hereinafter referred to as solenoid valve 300), which is shown in FIG. 2B and described later in detail, and provided with check valves, wherein the supply of the hydraulic braking pressure from the master cylinder 2a and the pumps 21, 22 and the discharge of the hydraulic braking pressure to the reservoirs 23, 24 are controlled in response to the operation of the solenoid valve 300, so that the hydraulic braking pressure, which is substantially linearly proportional (inverse proportional actually in the present embodiment) to a current fed to the solenoid valve 300, is supplied to each of the wheel brake cylinders 51 to 54.

FIG. 2B shows the solenoid valve 300 for use in the actuator 31, which is disclosed in U.S. Ser. No. 387,663 filed by some of the present inventors. The solenoid valves for use in other actuators 32 to 34 are substantially same as the solenoid valve 300 as shown in FIG. 2B. The solenoid valve 300 has a cylindrical case 301 and a cylindrical yoke 331, wherein the open ends of both the case 301 and the yoke 331 are bonded to each other. A magnetic spool 303 provided with a plunger 302 at one end thereof is slidably received in a cylinder bore defined in both the case 301 and the yoke 331. Two annular grooves 304, 305 are formed in the inner surface of the cylinder bore of the case 301 vertically to the axis of the cylinder bore. The annular groove 304 communicates with the hydraulic pressure generator 2 shown in FIG. 2A through a filter 337, while the annular groove 305 communicates with the reservoir 23. Further, a pressure chamber 309 is defined in the bottom portion of the case 301, and the plunger 302 of the spool 303 is fluid-tightly and slidably fitted into a through hole axially formed in the bottom portion of the case 301.

The spool 303 has three land portions with annular recesses 306, 307 defined therebetween. The recess 306 is formed so as to confront the annular groove 304 at an initial position as shown in FIG. 2B, while the recess 307 is formed so as to confront the annular groove 305. There is formed in the cylinder bore of the case 301 a port confronting the recess 306, so that the recess 306 always communicates with the wheel brake cylinder 51 through this port and a filter 338. The opening area of a flow passage defined by the recess 306 and the annular groove 304 is maximum in the initial position as shown in FIG. 2B, and is reduced as the spool 303 moves toward the yoke 331. The above flow passage is closed when the spool 303 reaches an approximately intermediate position of the cylinder bore. When the spool 303 further slides toward the yoke 331, the recess 306 is positioned so as to confront the annular groove 305, so that a flow passage is defined by the recess 306 and the annular groove 305. Then, the opening area of a flow passage defined by the recess 307 and the annular groove 305 is reduced as the spool 303 moves toward the yoke 331, whereas this flow passage always maintains the communication between the recess 307 and the annular groove 305.

The spool 303 is provided with a hole 308 which is bored axially and opens outwardly at the opposite land portions of the spool 303, and the hole 308 is communicated with the recess 307. Accordingly, each outward space of the opposite land portions of the spool 303 is communicated with the reservoir 23 through the annular grove 305, so that a pressure at the opposite ends of the spool 303 is a drain pressure. The pressure chamber 309 is communicated with the port of the case 301 opening to the recess 306 of the spool 303, so that the hydraulic braking pressure supplied from the hydraulic pressure generator 2 through the flow passage defined by the annular groove 304 and the recess 306 is supplied to the pressure chamber 309. Thus, as long as the flow passage is defined by the annular groove 304 and the recess 306, a pressing force acting on the end surface of the plunger 302 and exerting in the direction of the yoke 331 is applied to the spool 303.

In an inner cylindrical portion of the yoke 331, there is disposed a non-magnetic ring 332 to define an air gap thereby. The solenoid coil 333 is wound around the inner cylindrical portion of the yoke 331. One end of the solenoid coil 333 is connected to an electronic controller 10. A spring 334 is received in the cylinder bore of the yoke 331 so as to bias the spool 303 toward the pressure chamber 309.

According to the above-described solenoid valve 300, when a current is not fed to the solenoid coil 333, the spool 303 is at its initial position as shown in FIG. 2B, and when the hydraulic braking pressure is supplied from the hydraulic pressure generator 2, the hydraulic braking pressure is supplied to the wheel brake cylinder 51 as it is, whereby the pressure therein is increased.

When a current is fed to the solenoid coil 333, the spool 303 is moved toward the yoke 331 to throttle the flow passage defined by the annular groove 304 and the recess 306, so that the hydraulic braking pressure supplied to the wheel brake cylinder 51 is reduced in response to the movement of the spool 303. During the current fed to the solenoid coil 333 is small, an electromagnetic force exerted on the yoke 331 is also small, so that the distance, at which the spool 303 slides toward the yoke 331 against the biasing force of the spring 334, is small. In the mean time, since the spool 303 is positioned away from the yoke 331, the electromagnetic force corresponding to the magnitude of the current fed to the solenoid coil 333 is not applied due to the biasing force of the spring 334. Therefore, the pressure chamber 309 is provided in the present embodiment, whereby the hydraulic braking pressure discharged from the hydraulic pressure generator 2 is applied to the plunger 302 during the above condition so as to compensate the biasing force of the spring 334.

When the current fed to the solenoid coil 333 is gradually increased, the spool 303 is further moved toward the yoke 331 by the electromagnetic force, and the flow passage defined by the annular grove 304 and the recess 306 is closed to thereby provide a holding condition. Then, when the current fed to the solenoid coil 333 is further increased, the recess 306 is positioned to confront the annular groove 305, so that the wheel brake cylinder 51 is communicated with the reservoir 23. With the increase of the current fed to the solenoid coil 333, the opening area of the flow passage defined by the recess 306 and the annular groove 305 is increased, whereby the hydraulic pressure in the wheel brake cylinder 51 is reduced. When the spool 303 is brought into contact with a stopper disposed in the yoke 331, the opening area of the flow passage defined by the recess 306 and the annular groove 305 is maximum, so that the hydraulic pressure in the wheel brake cylinder 51 approximates to the drain pressure. During this condition, since the plunger 302 is applied with the drain pressure supplied to the pressure chamber 309 through the recess 306 and the annular groove 305, a force exerted against the biasing force of the spring 334 is small.

Figure 2C:
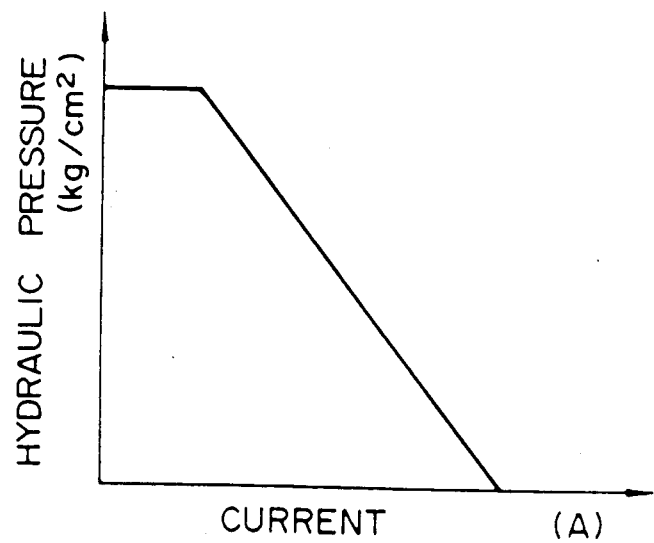
FIG. 2C is a diagram showing a relationship between a hydraulic pressure in a wheel brake cylinder and a current fed to the solenoid valve shown in FIG. 2B.

Accordingly, a substantially linear characteristic between the current fed to the solenoid coil 333 and the hydraulic pressure discharged from the solenoid valve 300 is obtained as shown in FIG. 2C, by properly setting the sectional area of the plunger 302, the dimention and the position of each of the annular grooves 304, 305 and the recesses 306, 307, the biasing force of the spring 334, and the electromagnetic force exerted by the solenoid coil 333. Further, there are disposed in the actuator 31 check valves 335, 336 which permit the return of brake fluid to the hydraulic pressure generator 2.

Referring to FIG. 2A, the actuators 31 to 34 are connected to the electronic controller 10 which controls the current fed to the solenoid coil 333 of the solenoid valve 300. The electric motor 20 is also connected to the electronic controller 10, so that the operation of the electric motor 20 is controlled by the electronic controller 10. At the road wheels FR, FL, RR and RL, there are provided wheel speed sensors 41 to 44 respectively, which are connected to the electronic controller 10, so that a signal representing a rotational speed of each road wheel, i.e., a wheel speed signal is fed to the electronic controller 10. Each of the wheel speed sensors 41 to 44 in the present embodiment comprises a pick-up having a coil wound around a permanent magnet and a rotor having an outer peripheral end thereof provided with teeth, and functions to output AC voltage. Since the structure of each wheel speed sensor is well known, the detailed description thereof will be omitted.

Figure 3:
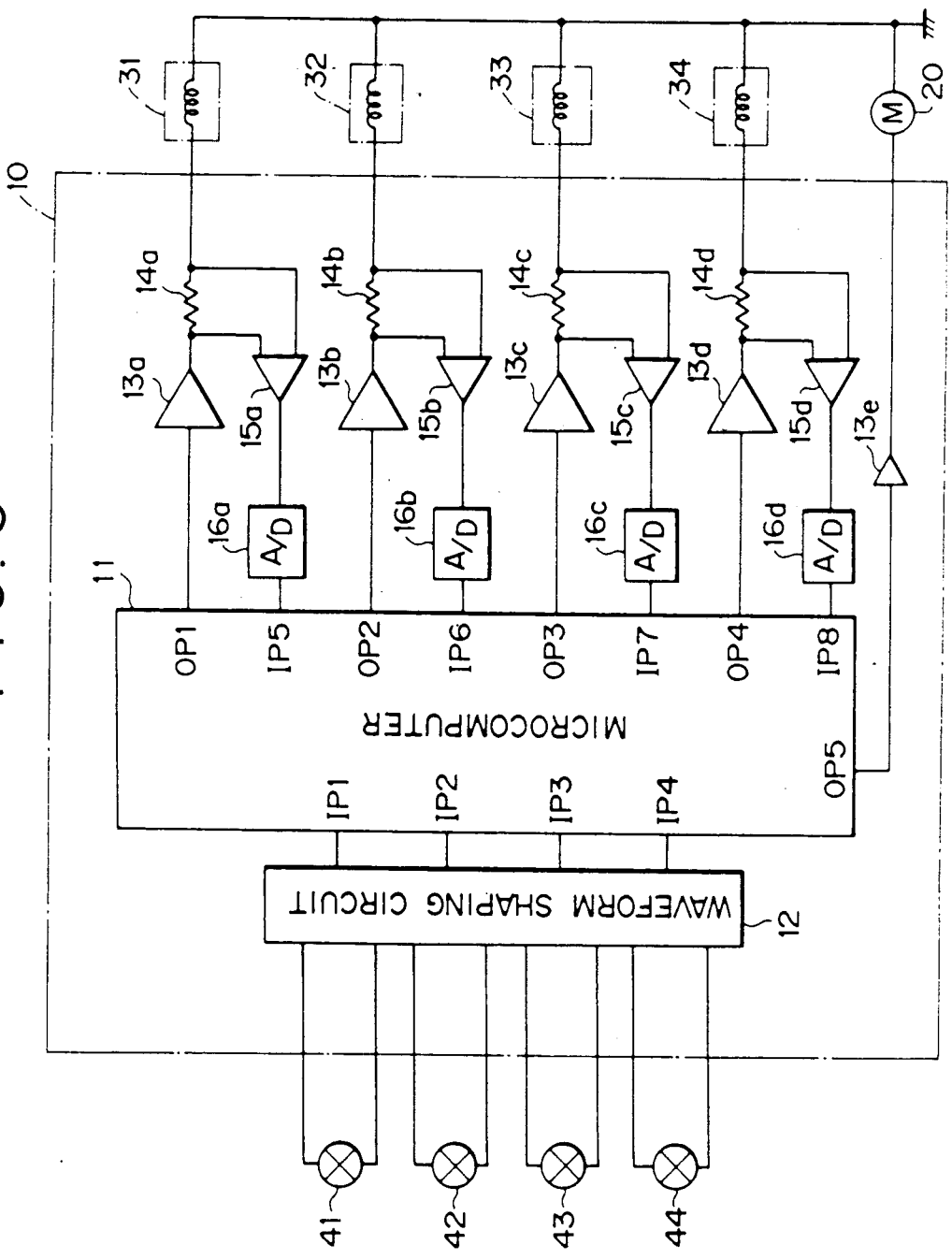
FIG. 3 is a block diagram illustrating the arrangement of the electronic controller shown in FIG. 1.

The electronic controller 10, as shown in FIG. 3, is provided with a microcomputer 11, which includes a central processing unit (CPU), a read-only memory (ROM) and a random access memory (RAM) which are not shown herein. The microcomputer 11 is provided with input ports IP1 to IP8 and output ports OP1 to OP5 connected with the CPU, ROM and RAM via a common bus (not shown) to execute the input/output operations relative to external circuits. The signal detected by each of the wheel speed sensors 41 to 44 is input to respective input ports IP1 to IP4 of the microcomputer 11 via a waveform shaping circuit 12. Then, a pulse width modulation (PWM) signal is output from the output ports OP1 to OP4 to each solenoid coil of the actuators 31 to 34 via the respective drive circuits 13a to 13d and the respective current detection resistors 14a to 14d, and a control signal is output from the output port OP5 to the electric motor 20 via a drive circuit 13e.

Each of the current detection resistors 14a to 14d is so arranged to detect the current fed to each solenoid coil of the actuators 31 to 34, and an ohmic value thereof is extremely low. Further, the signal detected by each of the current detection resistors 14a to 14d is input to the respective input ports IP5 to IP8 via respective voltage amplifiers 15a to 15d and respective A/D converters 16a to 16d.

Thus, in response to the PWM signal output from the microcomputer 11, each solenoid coil of the actuators 31 to 34 is energized by the respective drive circuits 13a to 13d, and a signal representing a value of the current fed to each solenoid coil is input to the microcomputer 11. The value of the current fed to each solenoid coil is substantially linearly inverse proportional to the hydraulic braking pressure supplied from each of the actuators 31 to 34 as shown in FIG. 2C, so that the signal input from the current detection registers 14a to 14d to each of the input ports IP5 to IP8 represents a signal corresponding to the hydraulic braking pressure supplied from the actuators 31 to 34 to the respective wheel brake cylinders 51 to 54.

A program routine executed by the electronic controller 10 for the anti-skid control will now be described with reference to FIGS. 4 through 13.

Figure 4:
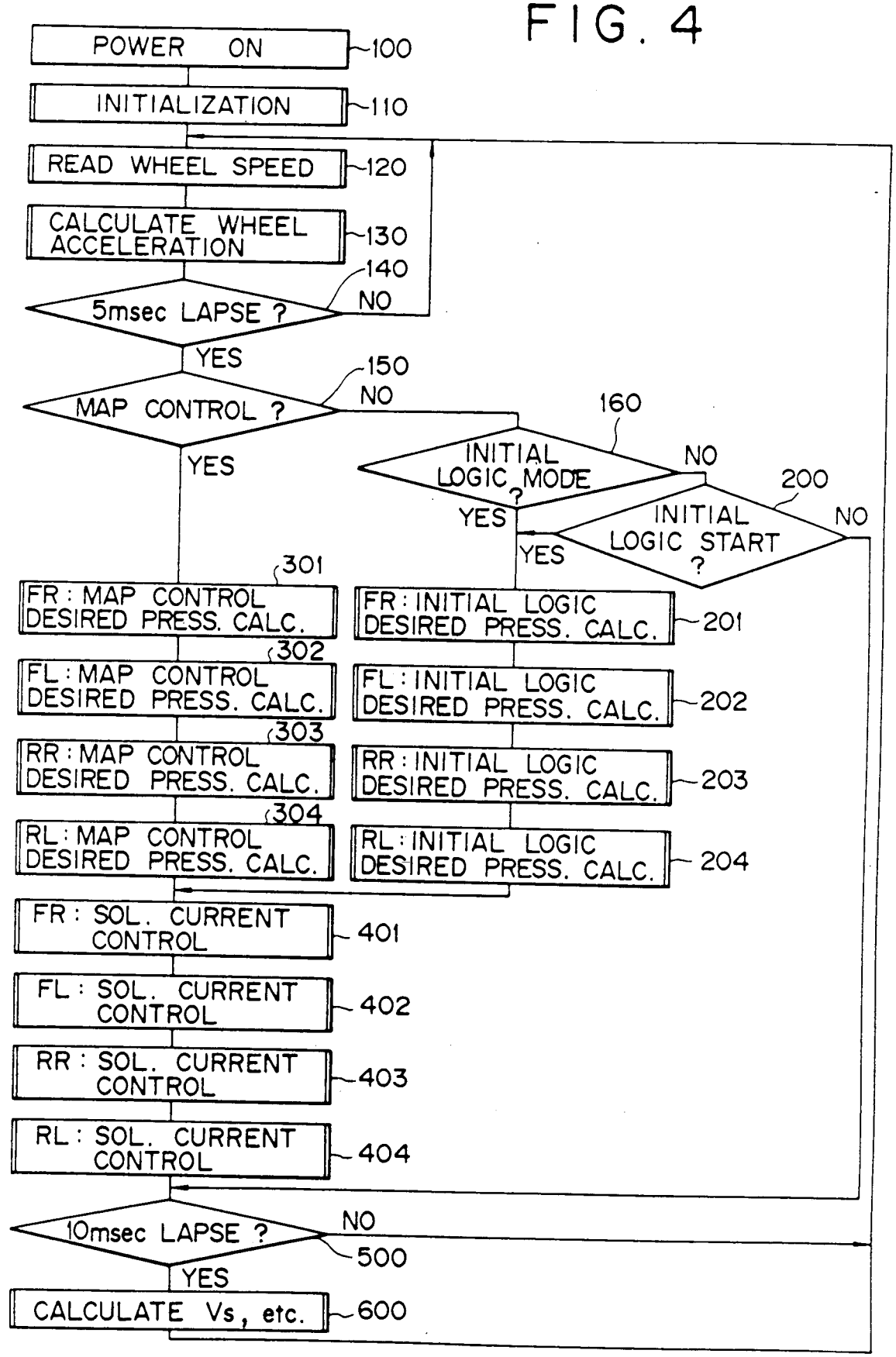
FIG. 4 is a flowchart showing the operation of the anti-skid control of the electronic controller shown in FIG. 2A.

FIG. 4 is a flowchart showing an overall operation executed in accordance with the program of the above-described embodiment of the present invention, and this program is executed repeatedly at intervals of a predetermined period of time. The program routine starts at Step 100 when a power source is turned on, and provides for initialization of the system at Step 110, wherein an estimated vehicle speed Vs which will be described later and wheel speed of each road wheel (hereinafter referred to as wheel speed Vw, representing each road wheel) are set to zero. Then, the program proceeds to Step 120 where the wheel speed Vw detected by each of the wheel speed sensors 41 to 44 is read and stored in the microcomputer 11.

Next, the wheel acceleration of each road wheel (hereinafter referred to as wheel acceleration DVW, representing each road wheel) is calculated from the wheel speed Vw at Step 130, while the slip rate S of each road wheel is calculated from the estimated vehicle speed Vs and the wheel speed Vw. Then, after a lapse of 5 millisecond (msec) is determined at Step 140, whether or not the map control is being executed is determined at Step 150. Namely, at Step 150, the program determines if the anti-skid control of each road wheel, which will be later described in detail, is being executed. Since the anti-skid control is not executed in the first routine, the program proceeds to Step 160 where it determines if an "initial logic" is being executed. This initial logic is executed at Steps 201 to 204 at a first stage of the anti-skid control, and will be described later in detail.

Figure 8:
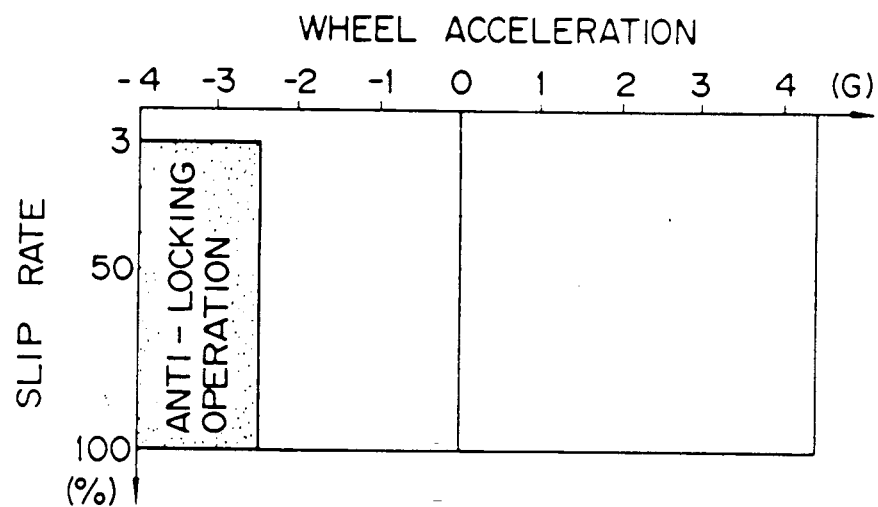
FIG. 8 is a diagram for determining if the initial logic in FIG. 4 is initiated.

The conditions for starting the initial logic are determined at Step 200. The anti-skid control is initiated, that is, the initial logic is executed according to the map as shown in FIG. 8. In the case where the wheel acceleration DVW is less than a predetermined value and the slip rate S is more than a predetermined value, the program proceeds to Steps 201 to 204. However, in the case where the acceleration DVW and the slip rate S are out of the dotted zone shown in FIG. 8, the program proceeds from Step 200 to Step 500 as it is. The dotted zone in FIG. 8 is defined such that the anti-skid control is initiated when the wheel acceleration DVW is less than a predetermined value, that is, the deceleration of the road wheel is large, since the wheel speed is rapidly decreased when the braking force is applied to the road wheel and then the road wheel is locked to start sliding.

When the desired hydraulic pressure for each of the wheel brake cylinders 51 to 54 is set at Steps 201 to 204 as described later in detail, the operation for discharging the hydraulic braking pressure of the same value as the desired hydraulic pressure to each of the wheel brake cylinders 51 to 54 is executed at Steps 401 to 404. Namely, the current fed to each solenoid coil of the actuators 31 to 34 is controlled such that the value of the hydraulic braking pressure supplied to each of the wheel brake cylinders 51 to 54 is equal to the value of the respective desired hydraulic pressure. As described before, each of the actuators 31 to 34 comprises the proportional pressure control solenoid valve 300 as shown in FIG. 2B, which is controlled by the current fed to each solenoid coil via the respective drive circuits 13a to 13d such that the hydraulic braking pressure is substantially linearly inverse proportional to the above current. Accordingly, the PWM output fed from the microcomputer 11 to the respective drive circuits 13a to 13d is set to a value corresponding to the desired hydraulic pressure, so that the hydraulic braking pressure supplied from each of the actuators 31 to 34 to each of the wheel brake cylinders 51 to 54 respectively is set to the respective desired hydraulic pressure.

When the execution of the initial logic is completed through Steps 201 to 204 and Steps 401 to 404, the hydraulic braking pressure control is executed according to the map for the wheel brake cylinders 51 to 54 of the respective road wheels FR, FL, RR and RL at Steps 301 to 304 and Steps 401 to 404 from the next routine on, and then the estimated vehicle speed Vs or the like is calculated and stored at 10 millisecond intervals (Steps 500, 600 and 120).

Next will be described the subroutine of the initial logic of the respective road wheels FR, FL, RR and RL at Steps 201 to 204 with reference to FIG. 5.

In transition to the initial logic, a timer is set, and the program determines if 20 milliseconds elapse at Step 211, so that the desired hydraulic pressure is set to that of a predetermined value, e.g., 20 kg/cm² during the 20 millisecond period after start of the initial logic at Step 212. Then, the program proceeds to Steps 401 to 404 in FIG. 4 where each of the actuators 31 to 34 is so controlled that the hydraulic braking pressure supplied to each of the wheel brake cylinders 51 to 54 comes to the desired hydraulic pressure of the predetermined value (20 kg/cm²).

Figure 9:
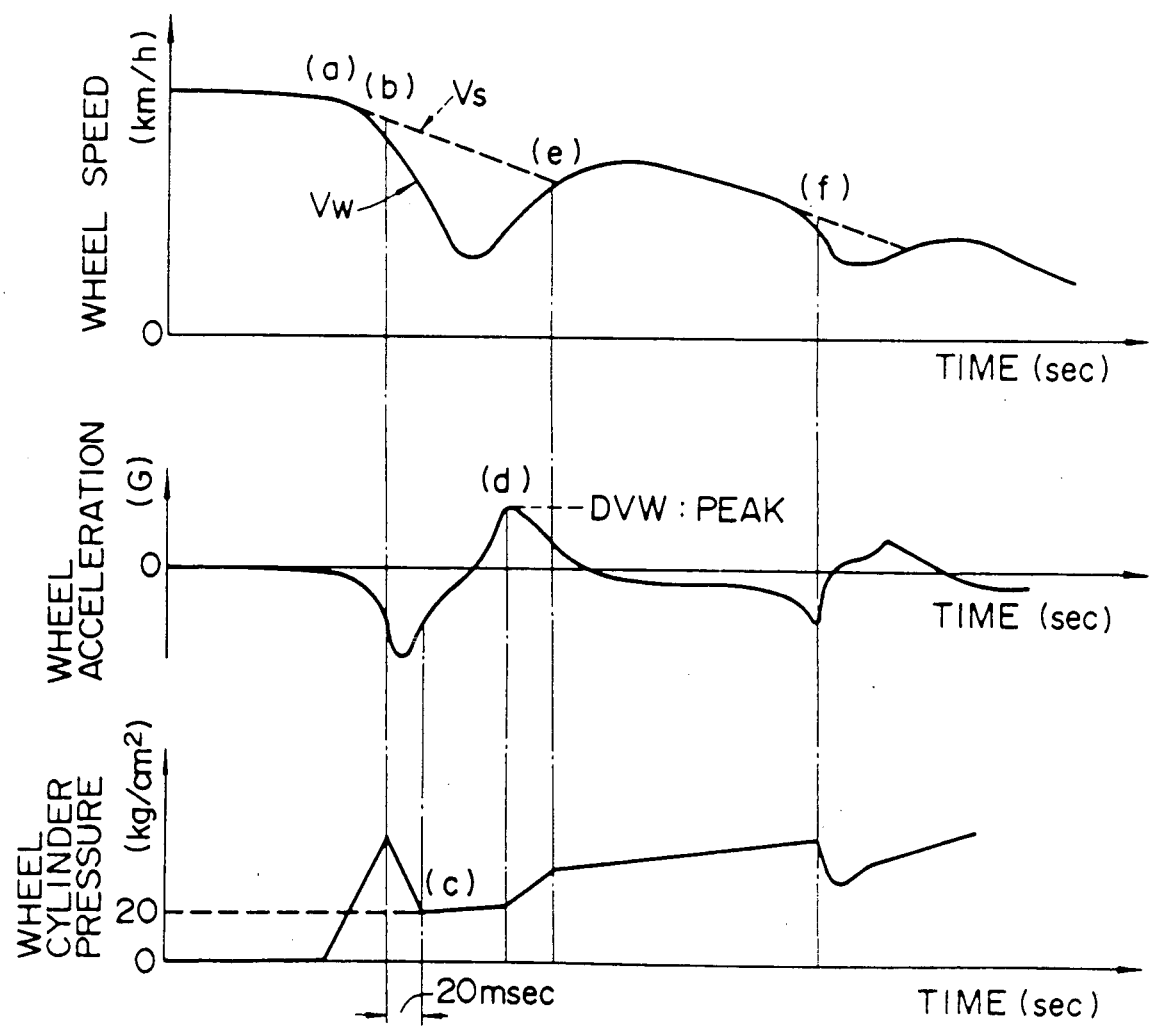
FIG. 9 is a timing chart of the wheel speed, wheel acceleration and wheel cylinder pressure of the embodiment shown in FIG. 2A.

The operation of the present embodiment during the above routine will be described with reference to FIG. 9 showing a timing chart of the wheel speed Vw, the wheel acceleration DVW and the wheel cylinder pressure during the braking operation. When a brake pedal 3 is depressed at a point indicated by (a) in FIG. 9, the hydraulic braking pressure of each of the wheel brake cylinders 51 to 54 is increased, so that the braking force is applied to the respective road wheels FR, FL, RR and RL. At a point indicated by (b) where the wheel acceleration DVW is decreased to a value less than a predetermined value, the anti-skid control is initiated. At the first stage of this anti-skid control, the wheel cylinder pressure is decreased to the desired hydraulic pressure of 20 kg/cm² rapidly during the 20 millisecond period. In other words, since the operation for decreasing the wheel cylinder pressure down to 20 kg/cm² takes approximately 20 milliseconds, this period is employed at Step 211. Thus, the period employed at step 211 is set in accordance with the value of the desired hydraulic pressure and the time for decreasing the wheel cylinder pressure down to that value by the respective actuators 31 to 34.

Figure 10:
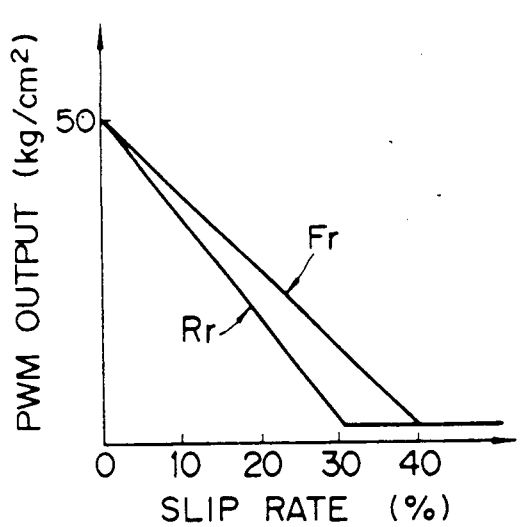
FIG. 10 is a diagram showing the relationship between the value Ps and the slip rate during the initial logic operation in FIG. 5.
Figure 11:
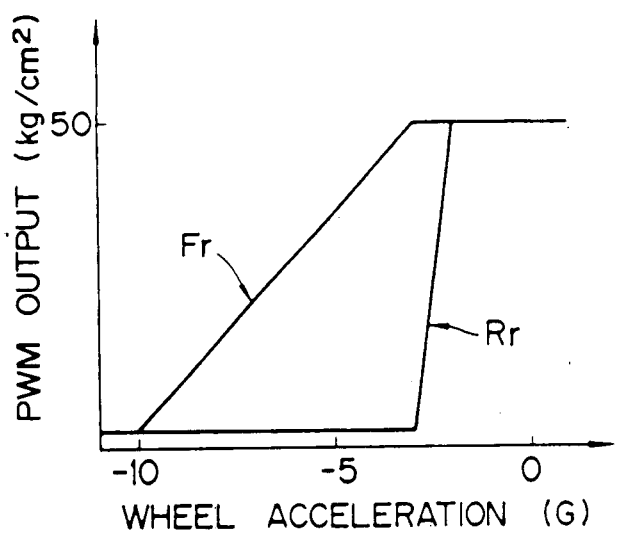
FIG. 11 is a diagram showing the relationship between the value Pg and the wheel acceleration during the initial logic operation in FIG. 5.
Figure 12:
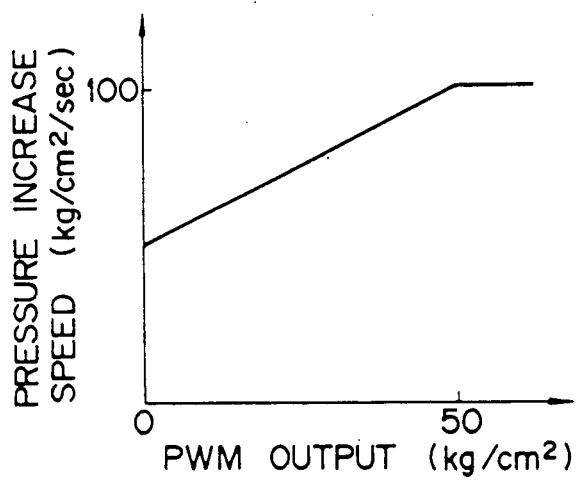
FIG. 12 is a diagram showing the relationship between the increasing speed of pressure and the PWM output fed to the actuator during the operation of increase at constant rate in FIG. 5.

When 20 milliseconds elapse after the transition to the initial logic, the program proceeds to Step 213 where it determines if the wheel cylinder pressure is being increased at a constant rate as shown in FIG. 12. Since the wheel cylinder pressure is not increased at this stage, the program proceeds to Step 214 where it determines if the peak of the wheel acceleration DVW is present, that is, it determines if the wheel acceleration DVW has reached its maximum. At this stage the wheel acceleration DVW has not reached its maximum, so that the value of the wheel acceleration DVW is compared with a predetermined value 5 G at Step 215. If the wheel acceleration DVW is less than 5 G, a desired hydraulic pressure Psg is calculated at Step 216 in accordance with the following equation:

$$Psg = \tfrac{1}{2}(Ps + Pg)$$

wherein a first value Ps is set on the basis of a diagram in FIG. 10 and a second value Pg is set on the basis of a diagram in FIG. 11. Both of the diagrams are provided in accordance with the characteristics of the vehicle. Namely, the first value Ps is set such that the hydraulic pressure discharged from each of the actuators 31 to 34, which is operated in response to the PWM output signal, is provided depending upon the slip rate S of each road wheel as shown in FIG. 10. The second value Pg is provided such that the hydraulic pressure discharged from each of the actuators 31 to 34, which is operated in response to the PWM output signal, is provided depending upon the wheel acceleration DVW of each road wheel as shown in FIG. 11. In FIGS. 10 and 11, a letter Fr designates the characteristics of the front road wheels, i.e., the road wheels FR, FL, whereas a letter Rr designates the characteristics of the rear road wheels, i.e., the road wheels RR, RL. The ordinate in each of FIGS. 10 and 11 represents the PWM output corresponding to the hydraulic pressure discharged from each of the actuators 31 to 34. Thus, the desired hydraulic pressure Psg is represented by the PWM output.

The desired hydraulic pressure Psg is set at Step 216 where a point of the minimum value of the wheel acceleration DVW in FIG. 9, i.e., the maximum value of the wheel deceleration has been passed when the wheel cylinder pressure is decreased to 20 kg/cm² at a point indicated by (c), so that the road wheel becomes free from being locked and the wheel acceleration DVW is being recovered. When the wheel acceleration DVW is recovered soon, the wheel acceleration DVW is to be increased, since it is presumed that the vehicle runs on the road surface of the high coefficient of friction At this time, the slip rate S is also recovered. Therefore, referring to FIG. 10, the slip rate S provides the PWM output corresponding to 30 kg/cm² of the first value Ps (hereinafter simply indicates a hydraulic pressure value), for example If the wheel acceleration DVW is close to zero G at this time, the second value Pg is 50 kg/cm² as is apparent from FIG. 11. Consequently, the desired hydraulic pressure Psg results in 40 kg/cm², whereby the desired hydraulic pressure is increased comparing with the initial desired hydraulic pressure, i.e., 20 kg/cm².

On the contrary, in the case where the vehicle runs on the road surface of the low coefficient of friction for example, even if the wheel cylinder pressure is decreased to 20 kg/cm², the wheel acceleration DVW continues to be decreased. Thus, when the slip rate S comes to 40%, for example, the first value Ps is as low as 4 to 5 kg/cm². Further, since the wheel acceleration DVW is also low because the road wheel tends to be locked, the second value Pg comes to about 30 kg/cm², for example. Consequently, the desired hydraulic pressure Psg results in about 17 kg/cm², which is lower than the initial desired hydraulic pressure of 20 kg/cm². Accordingly, it is possible to determine if the coefficient of friction of the road surface is high or low at least at this point (c).

Next, if it is determined that the wheel acceleration DVW is equal to or more than 5 G at Step 215, the program proceeds to Steps 217 and 218. If the wheel acceleration DVW is not zero G, the wheel speed Vw is compared with the estimated vehicle speed Vs. And, if the wheel speed Vw is still less than the estimated vehicle speed Vs, the following desired hydraulic pressure Psg is set at Step 219. Namely, the desired hydraulic pressure Psg at this Step 219 is set as a value which is obtained by adding a some amount (α) to the desired hydraulic pressure Psg calculated at Step 216, so as to gently increase the wheel cylinder pressure. Consequently, the pressure increasing operation is performed from a point indicated by (d) to a point indicated by (e) in FIG. 9.

Figure 5:
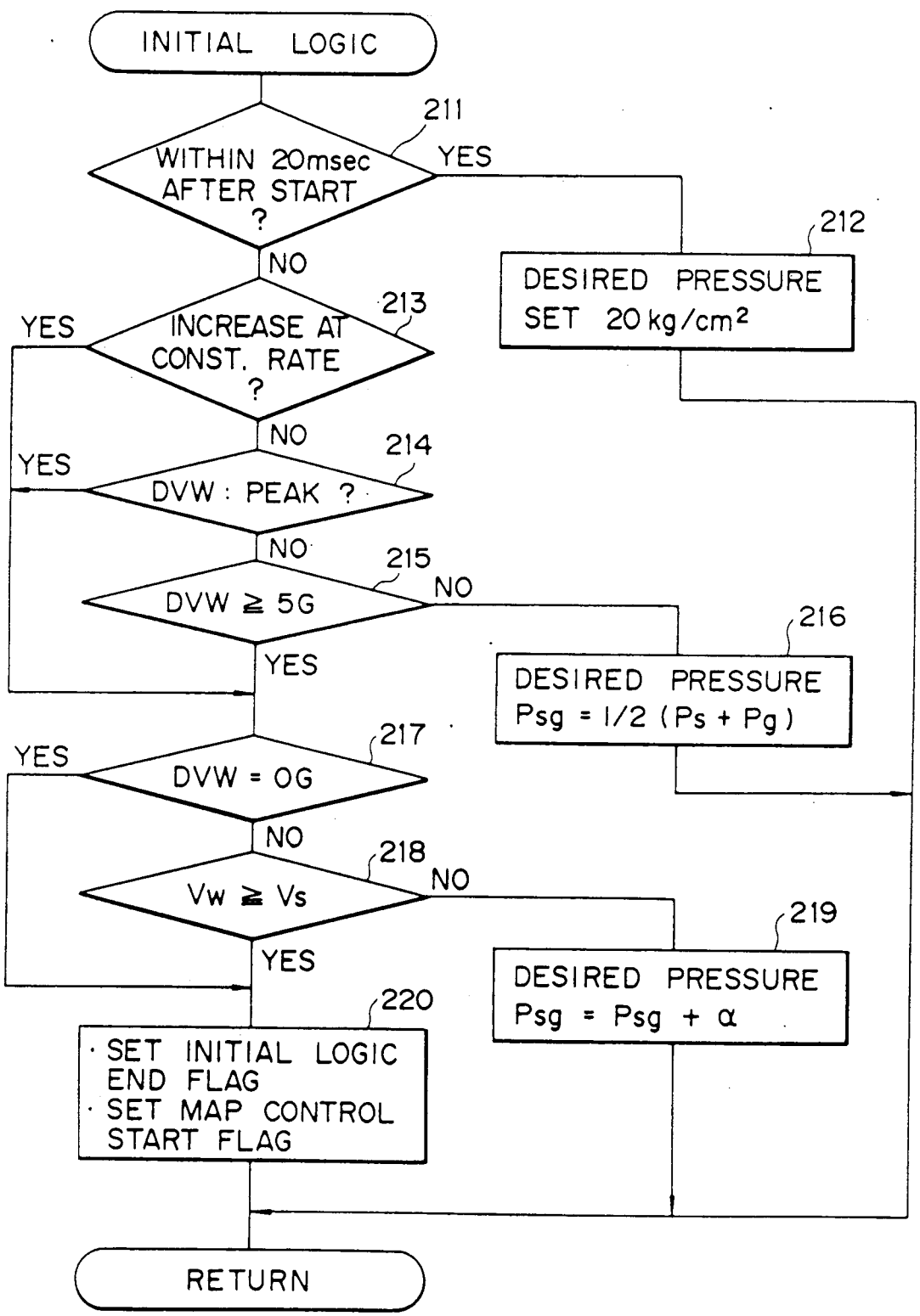
FIG. 5 is a flowchart showing the subroutine of the initial logic in FIG. 4.

After the operation of the initial logic is completed at Steps 200 to 204 and Steps 401 to 404 shown in FIG. 4, at a point indicated by (e) in FIG. 9 where the wheel speed Vw is equal to the estimated vehicle speed Vs the program proceeds from Step 218 shown in FIG. 5 to Step 220 where a flag indicating the end of the initial logic is set and also a flag indicating the start of the map control is set, so that the initial logic ends and the map control starts. Further, in the case where the wheel acceleration DVW is determined to be zero G at Step 217, the program proceeds to Step 220.

Figure 13:
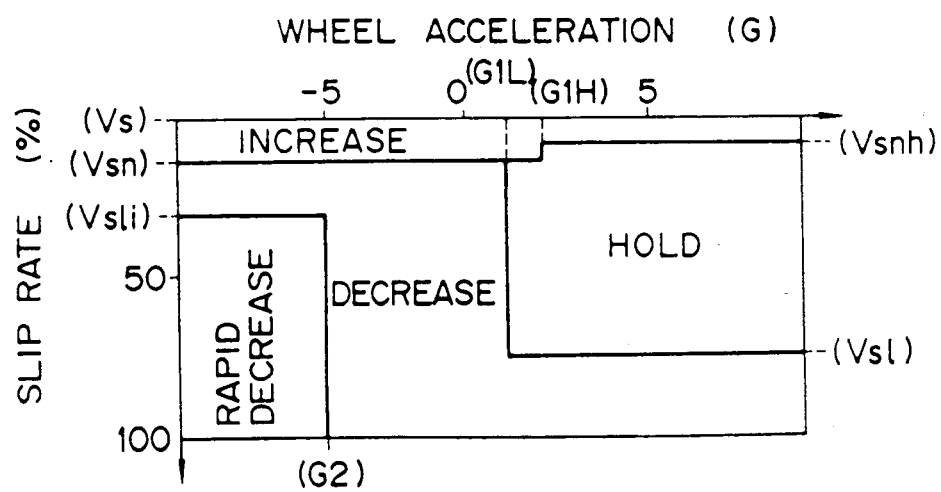
FIG. 13 is a diagram showing the relationship between the wheel acceleration and wheel speed used in the map control operation in FIG. 6.

When the map control start flag is set, calculation of the desired hydraulic pressure according to the map control for each road wheel is executed at Steps 301 to 304 shown in FIG. 4. There is stored in the microcomputer 11 a map which is defined by the wheel acceleration DVW and the slip rate S as parameters as shown in FIG. 13. The actuators 31 to 34 are controlled on the basis of this map.

First, when the wheel speed Vw is substantially equal to the estimated vehicle speed Vs as at a stage immediately after the transition to the map control, the actuators 31 to 34 are controlled so as to maintain that condition or the equality of the wheel speed VW and the estimated vehicle speed Vs as long as possible. Namely, assuming that the road wheel is locked at a point indicated by (f) in FIG. 9 and the wheel cylinder pressure is of the value P1 at this point, the wheel cylinder pressure of a certain ratio of the value P1, 80% or more for example, is able to exert a large braking torque without causing the locking of the road wheel. In order to maintain the wheel cylinder pressure control based upon the pressure of that value, i.e., 80% of P1 or more as long as possible, the wheel cylinder pressure is gently increased. On the other hand, if the value of the hydraulic pressure is less than 80% of the value P1, the wheel cylinder pressure is rapidly increased so as to reach 80% of the value P1 as fast as possible.

Figure 6:
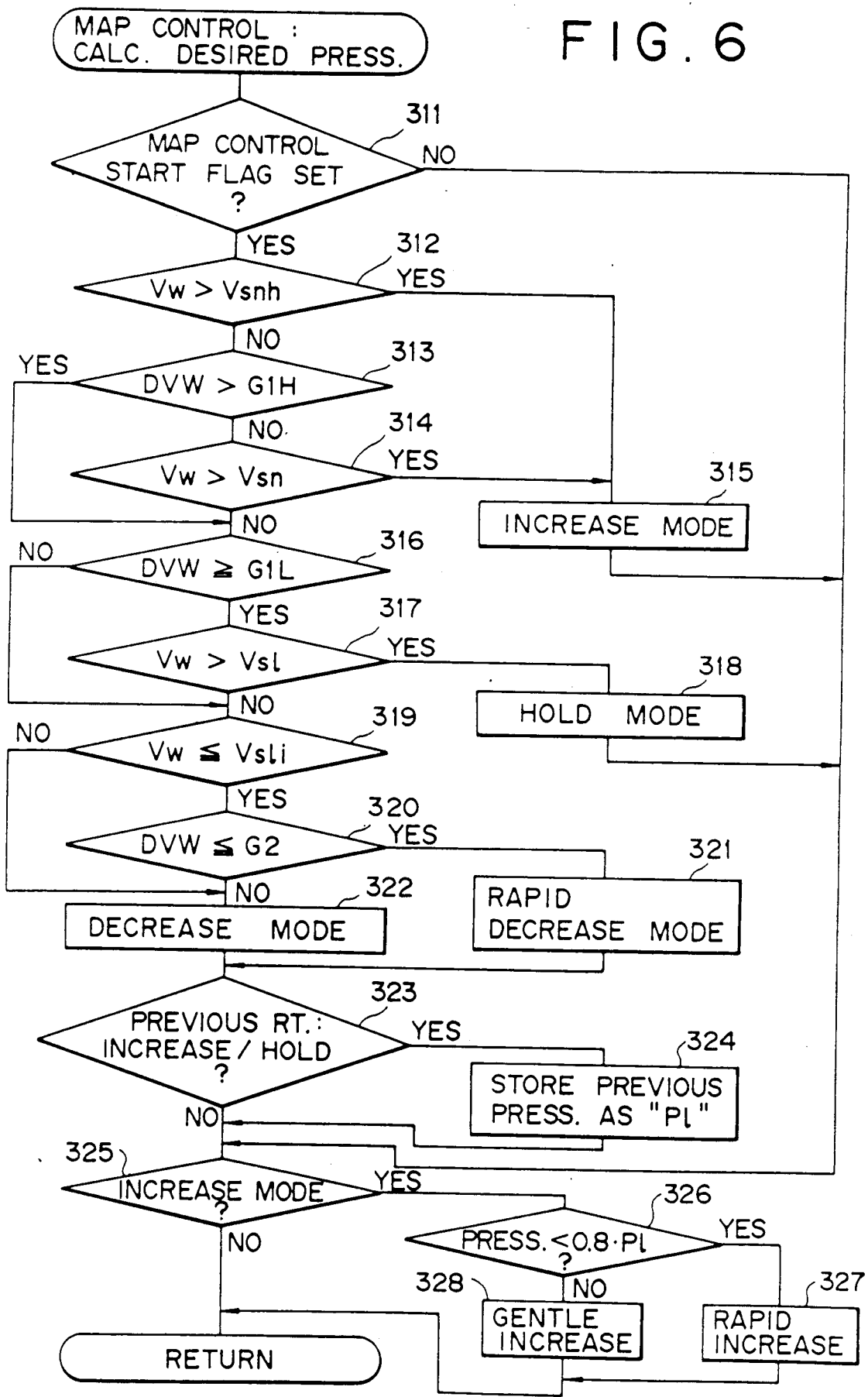
FIG. 6 is a flowchart showing the subroutine of the map control desired pressure calculation in FIG. 4.

Therefore, in accordance with the subroutine of Steps 301 to 304, an operational mode for increasing the wheel cylinder pressure to the desired hydraulic pressure (hereinafter referred to as increase mode) is set as shown in FIG. 6. If it is determined at Step 311 that the map control start flag is set, the program determines at Steps 312 to 314 whether or not the increase mode shall be executed. Namely, it is determined whether or not the values of the slip rate S and the wheel acceleration DVW fall within the region of the increase mode. When the program proceeds to Step 315 where the increase mode is set, the program proceeds through Step 325 to Step 326 where it is determined whether or not the wheel cylinder pressure is less than 80% of the value P1 in locking condition of the road wheel. If the wheel cylinder pressure is less than 80% of the value P1, a rapid increase signal is fed to each of the actuators 31 to 34 at Step 327. On the other hand, if it exceeds 80%, a gentle increase signal is fed at Step 328 so as to maintain this condition.

Following Step 314, the program proceeds to Steps 316 and 317 where it is determined whether or not the wheel acceleration DVW and the slip rate S fall within a "hold" region as shown in FIG. 13. If so, the program proceeds to Step 318 where a hold mode operation is performed such that the wheel cylinder pressure is held as it is. At Steps 319, 320, it is determined whether or not they fall within a "rapid decrease" region where the wheel cylinder pressure is decreased rapidly in a rapid decrease mode operation performed at Step 321.

In the case where the wheel acceleration DVW and the slip rate S are out of the above-described regions, a normal decrease mode operation is performed at Step 322. Thereafter, the program proceeds to step 323 where it determines if the condition at the previous cycle is the increase mode or the hold mode. If an affirmative decision is made, the value of the hydraulic pressure at the previous cycle is stored as a value P1 at Step 324. Then, as shown in FIG. 4, the estimated control speed Vs and other factors are calculated at 10 millisecond interval (Steps 500, 600), and the above-described map control is repeated.

Figure 7:
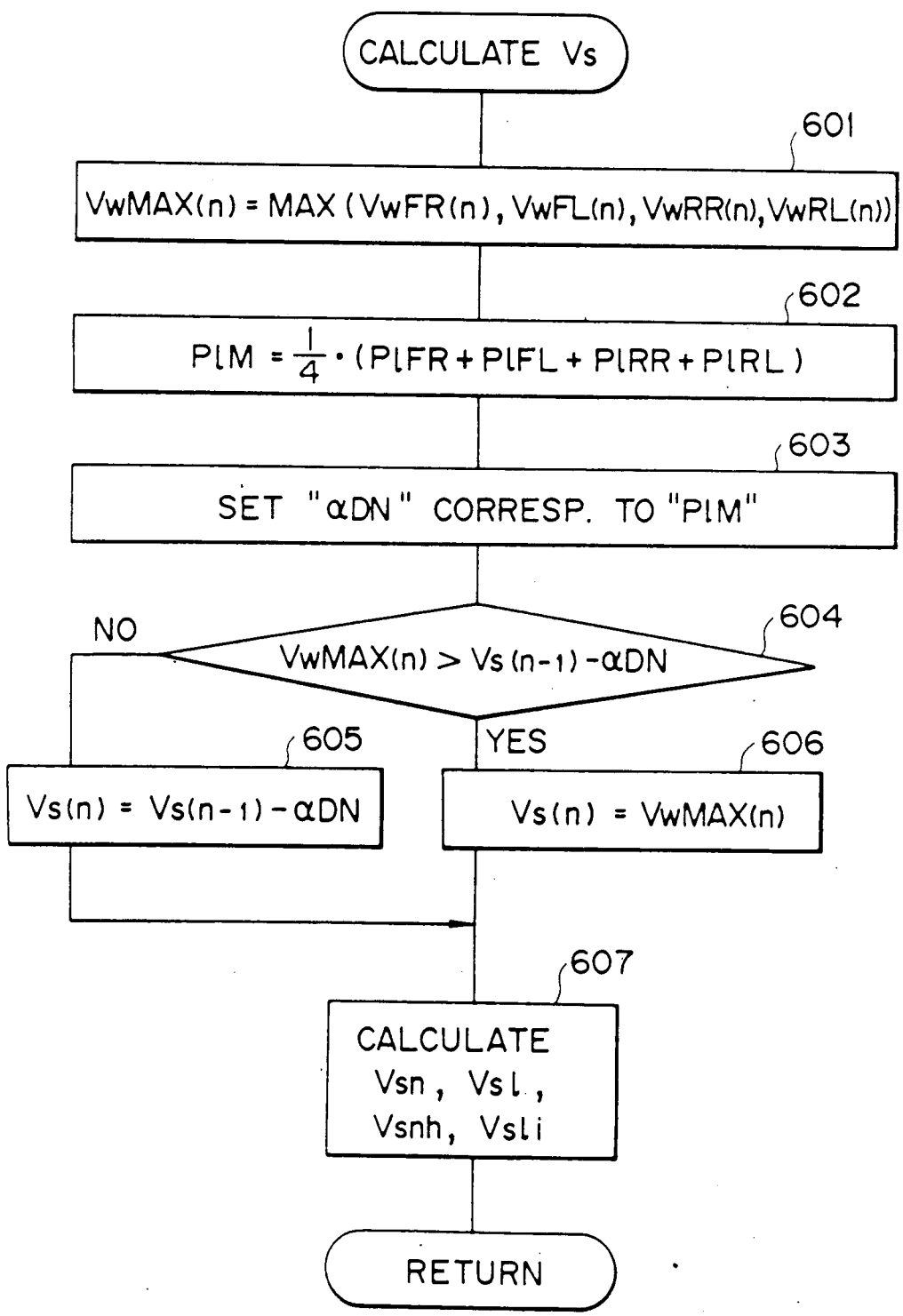
FIG. 7 is a flowchart showing the subroutine of the calculation of the estimated vehicle speed Vs in FIG. 4.

The estimated vehicle speed Vs is calculated in accordance with a flowchart shown in FIG. 7. First, the maximum value VwMAX(n) of the wheel speed VwFR(n), VwFL(n), VwRR(n) and VwRL(n) of four road wheels is calculated at Step 601. "n" represents a certain cycle where the routine is executed. Then, the program proceeds to Step 602 where the mean value P1M of the wheel cylinder pressures in locking condition of the respective road wheels P1FR, P1FL, P1RR and P1RL is calculated. And, an acceleration αDN (or, deceleration) corresponding to the mean value P1M is set in accordance with a predetermined diagram (not shown) at Step 603. From Step 603, the program proceeds to Step 604 where it determines if VwMAX(n) is greater than (Vs(n−1)−DN). If it is determined that VwMAX(n) is less than that value, (Vs(n−1)−DN) is set to Vs(n), otherwise VwMAX(n) is set to Vs(n) at Steps 605, 606 respectively. Thereafter, reference values corresponding to various vehicle speed Vsn, Vsl, Vsnh and Vsli shown in FIG. 13 are calculated at step 607, such as $Vsn = 0.9 \times Vs - 2(km/h)$, and $Vsl = 0.8 \times Vs - 10(km/h)$, for example.

In the above-described embodiment, the initial logic is executed only immediately after the start of the braking operation. However, even in the case where the wheel speed Vw is abnormally decreased during the map control, or in the case where the road wheel is not locked while the gentle increase of the wheel cylinder pressure lasts long, the initial logic described in FIGS. 4 and 5 may be executed.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An anti-skid control system for an automotive vehicle for installation in a vehicle braking system having a wheel brake cylinder for applying a braking force to a road wheel and pressure generating means for supplying a hydraulic braking pressure to said wheel brake cylinder, comprising:

actuating means disposed in a hydraulic circuit between said pressure generating means and said wheel brake cylinder for controlling said hydraulic braking pressure supplied to said wheel brake cylinder;

wheel speed detecting means for detecting a rotational speed of said road wheel; and braking force control means for controlling said braking force applied to said road wheel in response to at least an output of said wheel speed detecting means, wherein said braking force control means includes control means for operating said actuating means and desired hydraulic pressure for said control means, and wherein said control means operates said actuating means to control said hydraulic braking pressure supplied to said wheel brake cylinder to said desired hydraulic pressure, wherein said actuating means comprises a proportional pressure control solenoid valve for controlling said hydraulic braking pressure in substantially linear proportion to a current fed thereto, and wherein said braking force control means comprises current detecting means for detecting said current and providing an output thereof to said control means, said desired hydraulic pressure setting means setting said desired hydraulic pressure in response to said output of said current detecting means.

2. An anti-skid control system for an automotive vehicle as set forth in claim 1, wherein said desired hydraulic setting means is arranged to set a first desired hydraulic pressure of a predetermined value during a predetermined period of time after start of braking operation.

3. An anti-skid control system for an automotive vehicle as set forth in claim 2, wherein said desired hydraulic setting means is arranged to set a second desired hydraulic pressure of a value determined by an acceleration of said road wheel and a slip rate obtained from said output of said wheel speed detecting means during a period of time following said predetermined period of time up to the time when said acceleration of said road wheel is maximum.

4. An anti-skid control system for an automotive vehicle as set forth in claim 3, wherein said desired hydraulic pressure setting means is arranged to set a desired hydraulic pressure of a mean value of a first value determined by said acceleration and a second value determined by said slip rate as said second desired hydraulic pressure.

5. An anti-skid control system for an automotive vehicle as set forth in claim 4, wherein said desired hydraulic pressure setting means is arranged to set a third desired hydraulic pressure with a predetermined value gradually added to said second desired hydraulic pressure periodically after the end of said period of time during which said second desired hydraulic pressure is provided.

6. An anti-skid control system for an automotive vehicle as set forth in claim 4, wherein said control means comprises a microcomputer which outputs a pulse width modulation signal for operating said proportional pressure control solenoid valve to control said hydraulic braking pressure supplied to said wheel brake cylinder to said desired hydraulic pressure, and wherein said first value determined by said acceleration and said second value determined by said slip rate are stored in said microcomputer in the forms of a first schedule of said first value represented by the output of said microcomputer as a function of said acceleration and a second schedule of said second value represented by the output of said microcomputer as a function of said slip rate respectively.

7. An anti-skid control system for an automotive vehicle as set forth in claim 1, wherein said current detecting means comprises a current detecting resistor connected between said proportional pressure control solenoid valve and said control means.

8. An anti-skid control system for an automotive vehicle as set forth in claim 7, wherein said control means comprises a microcomputer which outputs a pulse width modulation signal for operating said proportional pressure control solenoid valve to control said hydraulic braking pressure supplied to said wheel brake cylinder to said desired hydraulic pressure.

* * * * *